United States Patent
Cimatti

(10) Patent No.: US 9,586,476 B2
(45) Date of Patent: Mar. 7, 2017

(54) VEHICLE WITH CONNECTABLE FOUR-WHEEL DRIVE

(71) Applicant: Ferrari S.p.A., Modena (IT)

(72) Inventor: Franco Cimatti, Pavullo (IT)

(73) Assignee: Ferrari S.p.A., Modena (IT)

( * ) Notice: Subject to any disclaimer, the term of this patent is extended or adjusted under 35 U.S.C. 154(b) by 110 days.

(21) Appl. No.: 14/334,506

(22) Filed: Jul. 17, 2014

(65) Prior Publication Data

US 2016/0016465 A1    Jan. 21, 2016

(30) Foreign Application Priority Data

Jul. 18, 2013 (IT) .............................. BO2013A0377

(51) Int. Cl.
| | |
|---|---|
| *B60K 17/34* | (2006.01) |
| *B60K 17/354* | (2006.01) |
| *B60K 17/02* | (2006.01) |
| *B60K 17/08* | (2006.01) |
| *B60K 17/16* | (2006.01) |
| *B60K 23/08* | (2006.01) |

(52) U.S. Cl.
CPC .............. *B60K 17/34* (2013.01); *B60K 17/02* (2013.01); *B60K 17/08* (2013.01); *B60K 17/165* (2013.01); *B60K 17/354* (2013.01); *B60K 23/0808* (2013.01); *B60K 2023/0875* (2013.01); *B60Y 2400/72* (2013.01)

(58) Field of Classification Search
CPC .... B60K 17/354; B60K 17/34; B60K 17/348; B60K 23/08; B60K 23/0808; B60K 2023/085; B60K 2023/0808
USPC ........ 180/245, 247, 233, 246, 248, 249, 250
See application file for complete search history.

(56) References Cited

U.S. PATENT DOCUMENTS

| | | | | |
|---|---|---|---|---|
| 5,417,298 | A | * 5/1995 | Shibahata | .............. B60K 23/04 180/233 |
| 2005/0087380 | A1 | * 4/2005 | Brown | ............... B60K 23/0808 180/233 |
| 2005/0173177 | A1 | * 8/2005 | Smith | .................. B60K 17/354 180/233 |

(Continued)

FOREIGN PATENT DOCUMENTS

| | | |
|---|---|---|
| DE | 10 2009 029 917 A1 | 12/2010 |
| EP | 2 228 249 A1 | 9/2010 |

(Continued)

*Primary Examiner* — Anne Marie Boehler
(74) *Attorney, Agent, or Firm* — Blank Rome LLP

(57) ABSTRACT

A vehicle with connectable four-wheel drive. The vehicle includes an engine with a drive shaft; a pair of main drive wheels; a main transmission line which permanently connects the drive shaft to the main drive wheels, the main transmission line including a main gearbox and a main differential; a pair of normally driven secondary drive wheels; and a connectable secondary transmission line for connecting the drive shaft also to the secondary drive wheels and having a geared transmission, at least one secondary clutch which on one side is connected to the drive shaft upstream of the main gearbox and on the other side is connected to the secondary drive wheels, and a continuously variable transmission which is controlled electronically to vary its transmission ratio in a continuous manner between two limit values without ever interrupting the transmission of the driving torque.

10 Claims, 2 Drawing Sheets

(56) References Cited

U.S. PATENT DOCUMENTS

2010/0206654 A1* 8/2010 Cimatti ............. B60K 23/0808
   180/246
2010/0224431 A1* 9/2010 Cimatti ................. B60K 17/04
   180/245

FOREIGN PATENT DOCUMENTS

| WO | WO 2005/080117 A2 | 9/2005 |
| WO | WO 2006/100585 A1 | 9/2006 |
| WO | WO 2008/120097 A1 | 10/2008 |

* cited by examiner

US 9,586,476 B2

VEHICLE WITH CONNECTABLE FOUR-WHEEL DRIVE

FIELD OF THE INVENTION

The present invention relates to a vehicle with connectable four-wheel drive.

The present invention advantageously applies to a high performance sports car to which the following description will explicitly refer without loss of generality.

DESCRIPTION OF THE RELATED ART

A high performance sports car generally has a rear-wheel drive and is provided with a self-locking differential to try to maximize in every condition the driving torque transmitted by the rear wheels to the road surface.

The rear-wheel drive with self-locking differential is rewarding for a sporty driving in optimal (dry road) or in any case fair (wet) grip conditions; however, this solution combined with a high driving torque and wide tires involves an extremely difficult and potentially dangerous driving when the grip conditions are bad (flooded or icy road). In order to improve the driveability of a sports car in poor grip conditions, it has been proposed to use the permanent or connectable four-wheel drive.

The permanent four-wheel drive allows to considerably improve the behavior of the car in poor grip conditions but has the drawbacks of increasing in every situation the torque losses of the transmission system and of imparting a behavior to the car in optimal grip conditions that are not always appreciated by the drivers.

The connectable four-wheel drive allows the driver to decide whether to use the rear-wheel drive or use the four-wheel drive; in this way, the driver can use the rear-wheel drive in optimal grip conditions and the four-wheel drive in poor grip conditions.

The patent application WO2005080117A2 describes a vehicle with connectable four-wheel drive which is provided with an engine having a drive shaft, a pair of main driving wheels permanently connected to the drive shaft through the interposition of a gearbox provided with a first clutch, and with a pair of secondary drive wheels, which can be selectively connected to the drive shaft through a connectable transmission system. The connectable transmission system has a second clutch, which on one side is connected with a fixed transmission ratio to the drive shaft upstream of the gearbox and the other side is connected with a fixed transmission ratio to the secondary drive wheels.

The patent application WO2006100585A1 describes an evolution of the vehicle with connectable four-wheel drive described in patent application WO2005080117A2; in particular, the percentage value of a driving torque to be transmitted to the secondary drive wheels through the second clutch is determined instant by instant as a function of the dynamic parameters of the vehicle detected by respective sensors.

In the solutions proposed in patent applications WO2005080117A2 and WO2006100585A1, the four-wheel drive can be connected only in some lower gears (typically first and second) and cannot be connected in other gears. The patent application WO2008120097A1 describes a further evolution of the vehicle with connectable four-wheel drive described inpatent applications WO2005080117A2 and WO2006100585A1, wherein the connectable secondary transmission line adapted to connect the drive shaft also to the secondary drive wheels comprises a gear transmission having two different transmission ratios selectable in alternative to each other. In this way, the connectable four-wheel drive described in patent application WO2008120097A1 allows connecting the four-wheel drive (i.e., transferring driving torque to the front wheels) in the first four forward gears of the gearbox. In other words, using a first transmission ratio of the connectable secondary transmission line ensures the connection of the four-wheel drive (that is, the transfer of the driving torque to the front wheels) when the first gear I or the second gear II are connected to the gearbox, while using the other transmission ratio of the connectable secondary transmission line ensures the connection of the four-wheel drive (that is, the transfer of the driving torque to the front wheels) when the third gear III or the fourth gear IV are connected to the gearbox. However, there are some drawbacks: it is impossible to connect the four-wheel drive (i.e. transfer the driving torque to the front wheels) when a higher gear than fourth gear IV is connected to the gearbox, and in the clutch of the connectable secondary transmission line there is a very strong thermal energy dissipation when a gear is connected to the gearbox with a transmission ratio different from the transmission ratio of the connectable secondary transmission line. Furthermore, the connectable secondary transmission line uses a synchronizer engagement that requires a torque interruption on the front axle for the transition from one gear to the other, and this inevitably causes an interruption of the driving torque on the front when the gearbox shifts from second gear II to third gear III, and vice versa; if the gearbox is double clutch, when the gearbox shifts from second gear II to third gear III there occurs an interruption of the driving torque only on the front (i.e., the rear is always in traction) and this sudden and impulsive loss of the four-wheel drive can unbalance the car set-up, especially when traveling on a medium-low grip road.

In patent application EP2228249A1, the secondary transmission line also comprises a movement reversal unit which is operable for reversing or not the direction of movement and allows connecting the four-wheel drive (i.e., transferring driving torque to the front wheels) even when the reverse gear is selected.

Patent application DE102009029917A1 describes a vehicle with four-wheel drive provided with an internal combustion engine arranged centrally and two twin transmission lines, each of which originates from a side of the internal combustion engine, transmits the motion to a corresponding axle and is provided with both a clutch and a gearbox which, according to a possible embodiment, may also be of the continuous type (also called "CVT" or Continuously Variable Transmission).

DESCRIPTION OF THE INVENTION

The object of the present invention is to provide a vehicle with connectable four-wheel drive, which is easy and cheap to implement, is free from the drawbacks described above and, at the same time, allows for increased performance, stability, and traction in all grip conditions.

According to the present invention, a vehicle with connectable four-wheel drive is provided as set forth in the accompanying claims.

BRIEF DESCRIPTION OF THE DRAWINGS

The present invention will now be described with reference to the accompanying drawings, which show some non-limiting embodiment examples thereof, in which.

PREFERRED EMBODIMENTS OF THE INVENTION

Figure 1:
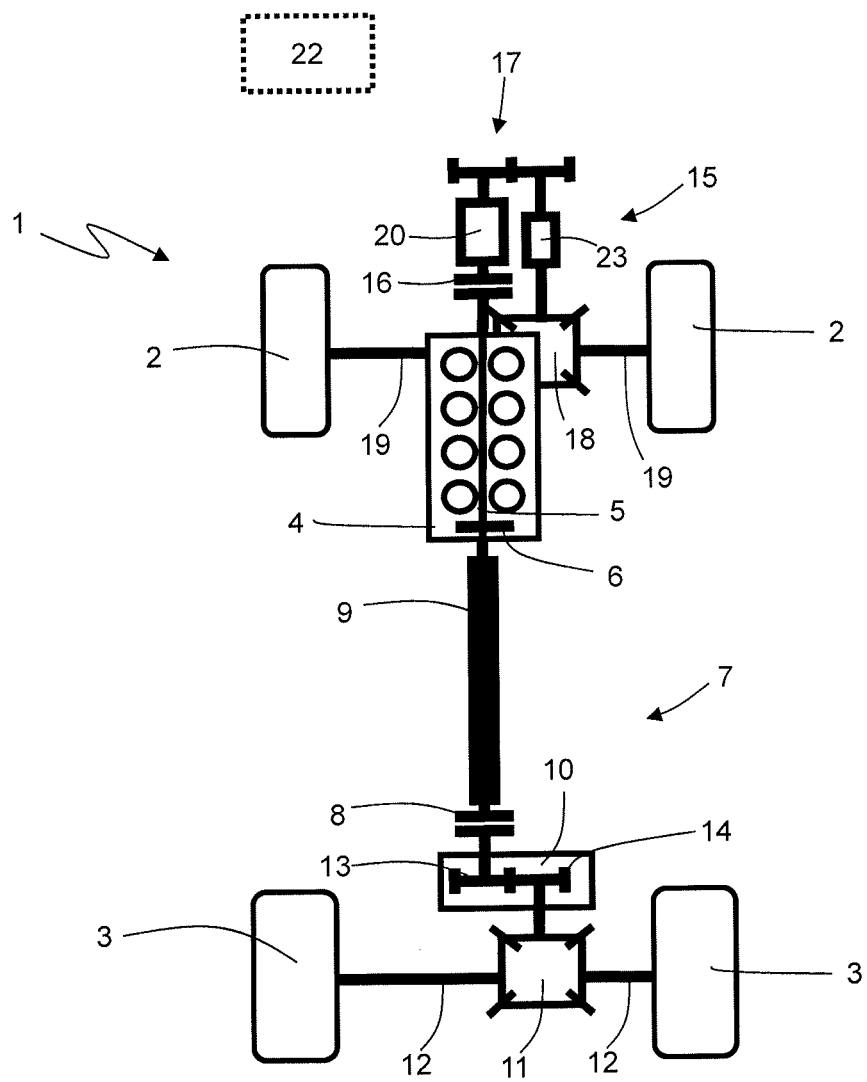
FIG. 1 shows a schematic view and plan view of a car with connectable four-wheel drive implemented according to the present invention.

In FIG. 1, reference numeral 1 indicates a car provided with two normally driven front wheels 2 (or secondary drive wheels) and two constantly driving rear wheels 3 (or main drive wheels). Car 1 comprises an internal combustion engine 4, which is arranged in longitudinal front position, is provided with a drive shaft 5 carrying a flywheel 6, and is connected to the rear drive wheels 3 through a main transmission line 7. The main transmission line 7 comprises a main clutch 8, which is arranged at the rear axle and is connected on one side to the drive shaft 5 of engine 4 by a drive shaft 9 and on the other side to a main gearbox 10 arranged at rear axle. A rear differential 11 (or main differential) is connected in cascade to the main gearbox 10, from which differential a pair of rear axle shafts 12 departs, each of which is integral with a rear wheel 3. A primary shaft 13 of the main gearbox 10 is integral with an output of the main clutch 8 while a secondary shaft 14 of the main gearbox 10 is coupled to the rear differential 11. According to a preferred embodiment, the main gearbox 10 is double clutch, i.e. it integrates two main clutches 8 connected to two corresponding primary shafts 13; in this way, the main gearbox 10 allows performing gear shifts without interrupting the traction on the rear wheels 3.

Car 1 comprises a connectable secondary transmission line 15 which is adapted to connect the drive shaft 5 also to the front wheels 2 in such a way as to make also the front wheels 2 themselves driving. The secondary transmission line 15 comprises a secondary clutch 16, which on one side is connected to the drive shaft 5 upstream of the main gearbox 10 and on the other side is connected to the front wheels 2 through a geared transmission 17 and a front differential 18 (or secondary differential) from which a pair of front axle shafts 19 depart which are integral with the front wheels 2.

In order for the secondary clutch 16 to transfer driving torque to the front differential 18 (i.e. the front wheels 2), it is necessary that the output of the secondary clutch 16 is slower than or has the same speed as the input of the secondary clutch 16. If the secondary clutch 16 were closed as the output of the secondary clutch 16 rotates faster than the input of the secondary clutch 16, then the secondary clutch 16 would transfer torque from the front differential 18 to the main gearbox 10, i.e. towards the rear drive wheels 3, generating a braking of the front wheels 2 and a torque overload on the rear drive wheels 3.

The connectable secondary transmission line 15 also comprises a continuously variable transmission 20 (also called "CVT") that is controlled electronically to vary its transmission ratio in a continuous manner (i.e. without interruption) between two limit values without ever interrupting the transmission of the driving torque. The lower limit value of the transmission ratio of the continuously variable transmission 20 is such that the input and the output of the secondary clutch 16 have the same speed when the first gear (i.e. the forward shorter or lower gear) is engaged in the main gearbox 10; the upper limit value of the transmission ratio of the continuously variable transmission 20 is such that the input and the output of the secondary clutch 16 have the same speed when a higher gear than the first gear is engaged in the main gearbox 10.

In an ideal embodiment, the upper limit value of the transmission ratio of the continuously variable transmission 20 is such that the input and the output of the secondary clutch 16 have the same speed when the longest (highest) gear is engaged in the main gearbox 10; in this way, the connectable secondary transmission line 15 is usable with any ratio engaged in the main gearbox 10. In a more limited (but simpler and with more compact construction) embodiment, the upper limit value of the transmission ratio of the continuously variable transmission 20 is such that the input and the output of the secondary clutch 16 have the same speed when a relatively high gear (for example, the fourth gear or the fifth gear) is engaged in main gearbox 10; in this way, the connectable secondary transmission line 15 is usable only until in the main gearbox 10 it is lower than or equal to the fourth gear or the fifth gear (to this end, it should be noted that the advantages of the four-wheel drive are modest when higher gears are engaged in the main gearbox 10, or when the speed of car 1 is relatively high).

According to a preferred embodiment, the continuously variable transmission 20 is with roller (or toroidal) and comprises two rollers (an input and an output), with a slightly conical shape, with the concave edge such as to be inserted in the central hole of a torus, facing the tip and on the same axis. One or more rollers are pressed in the resulting cavity arranged on a plane parallel to the axis of the system. If the axis of the roller is orthogonal to the axis of the system, the roller touches the two cones at the same height and the transmission ratio is unitary; by inclining the rollers, the contact on a cone moves towards the center and towards the periphery on the other, thus varying the transmission ratio.

A control unit 22 controls the continuously variable transmission 20 of the connectable secondary transmission line 15 so that the transmission ratio of the continuously variable transmission 20 (and therefore of the connectable secondary transmission line 15) is always coordinated with the transmission ratio of the main gearbox 10 (i.e. with the gear engaged in the main gearbox 10). The control mode of the secondary clutch 16 is fully described in patent application WO2006100585A1; the only difference is that the control unit 22 can rely on different transmission ratios of the continuously variable transmission 20 to always or almost always transmit driving torque to the front wheels 2.

According to a preferred embodiment, the secondary transmission line 15 also comprises a movement reversal unit 23 which is controlled by the control unit 22 to reverse or not the direction of movement; when a forward gear is selected in the main gearbox 10, the control unit 23 controls the movement reversal unit so as not to make any reversal of movement (i.e. so as to also rotate the front wheels 2 for forward driving), while when the reverse gear is selected in the main gearbox 10, then the control unit 22 controls the movement reversal unit 23 so as to reverse the movement (i.e. so as to also rotate the front wheels 2 for the reverse driving). The movement reversal unit 23 can be separated and independent from the continuously variable transmission 20 or it can be integrated within the same continuously variable transmission 20. It should be noted that in the case of reverse gear, clutch 16 may operate in slipping, since the energy dissipation that occurs during the use of the reverse gear is generally negligible (the reverse gear is rarely used and in reversing car 1 travels very limited distances).

Figure 2:
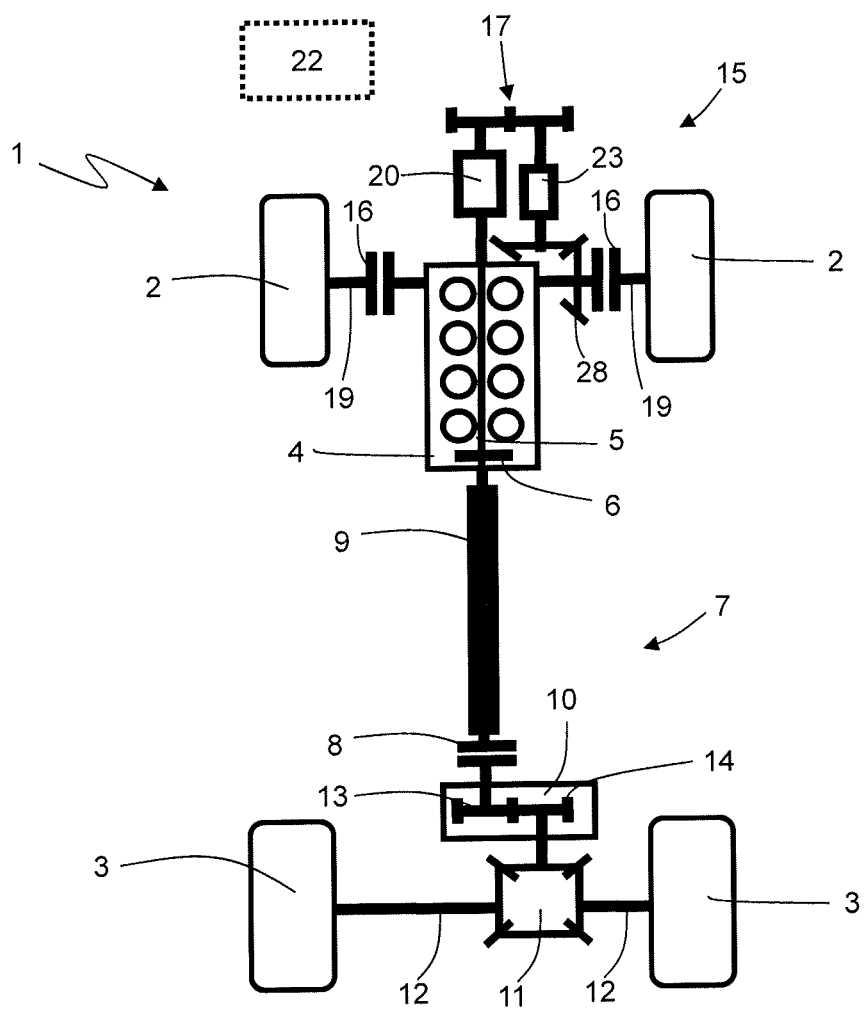
FIG. 2 shows a schematic and plan view of a variant of the car in FIG. 1.

In the variant shown in FIG. 2, the connectable secondary transmission line 15 is devoid of the front differential 18 and comprises a pair of secondary clutches 16, each of which is directly coupled to a respective front wheel 2. In particular, each secondary clutch 16 is coaxial to the respective front wheel 2 and has an output keyed to an axle shaft 19 of the respective front wheel 2. The connectable secondary transmission line 15 comprises a conical torque 28 for transmitting the motion from the drive shaft 5 to the secondary clutches 16 and, as mentioned above, it is devoid of the front differential 18 whose function is performed by the secondary clutches 16. In other words, a possible difference in the rotation speed between the two front wheels 2 is compensated by means of a corresponding difference in the slip of the two secondary clutches 16.

As said above, the control unit 22 controls the continuously variable transmission 20 of the connectable secondary transmission line 15 such that the transmission ratio of the continuously variable transmission 20 (and therefore of the connectable secondary transmission line 15) is always coordinated with the gear engaged in the main gearbox 10.

In the embodiment shown in FIG. 1, the control unit 22 controls the continuously variable transmission 20 of the connectable secondary transmission line 15 in such a way that the output of the secondary clutch 16 always has the same speed as the input of the secondary clutch 16; in this way, the secondary clutch 16 never works in slipping and has no significant energy dissipation (as a consequence, also the cooling system of the secondary clutch 16 can be reduced significantly).

In the embodiment shown in FIG. 2 and when car 1 is on a straight road (i.e., when the steering angle of the front wheels 2 is substantially zero), the control unit 22 controls the continuously variable transmission 20 of the connectable secondary transmission line 15 in such a way that the output of each secondary clutch 16 always has the same speed as the input of the secondary clutch 16 itself; in this way, the secondary clutch 16 does not work in slipping and has no significant energy dissipation when car 1 is on a straight road. Moreover, in the embodiment shown in FIG. 2, and only when car 1 is turning (i.e., when the steering angle of the front wheels 2 is not zero), the control unit 22 controls the continuously variable transmission 20 of the connectable secondary transmission line 15 in such a way that the output of each secondary clutch 16 is always slightly slower than the input of the secondary clutch 16 itself (indicatively, the output of each secondary clutch 16 rotates more slowly than 50-200 RPM with respect to the input of the secondary clutch 16 itself); in this way, the two secondary clutches 16 can be adjusted to compensate for the difference in the rotation speed between the two front wheels 2 (as it happens when turning wherein the front wheel 2 external to the turn rotates faster than the front wheel 2 internal the turn); in other words, when car 1 is turning, the transmission ratio of the continuously variable transmission 20 may be lengthened so that the input of each secondary clutch 16 always rotates faster than the output of the secondary clutch 16 itself so as to ensure the correct torque transmission to the front axle in all the radii of trajectory. According to a possible embodiment, when car 1 is steering (i.e., when the steering angle of the front wheels 2 is not zero), the control unit 22 controls the continuously variable transmission 20 of the connectable secondary transmission line 15 such that the speed difference between input and output of each secondary clutch 16 is variable and increases as the steering angle increases; i.e., the greater the steering angle, the greater the speed difference between input and output of each secondary clutch 16.

From a practical point of view, when car 1 is turning (i.e., when the steering angle of the front wheels 2 is not zero), the control unit 22 lengthens (increase) slightly the transmission ratio of the continuously variable transmission 20 in such a way that the input of each secondary clutch 16 rotates faster than the output of the secondary clutch 16 itself (instead, on a straight road, the input and the output of each secondary clutch 16 rotate at the same speed); the speed difference between input and output of each secondary clutch 16 (i.e., the elongation of the transmission ratio of the continuously variable transmission 20) is not constant, but is a function of the steering angle and in particular is increasing as the steering angle increases. To summarize, when car 1 is on a straight road, the transmission ratio of the continuously variable transmission 20 is such that the input and the output of each secondary clutch 16 rotate at the same speed, while when car 1 is turning, the transmission ratio of the continuously variable transmission 20 is slightly elongated compared to the same situation on a straight road in such a way that the input of each secondary clutch 16 rotates faster than the output of the secondary clutch 16 itself It should be noted that only the main clutch 8 and the main gearbox 10 are sized to continuously transmit all the driving torque that can be generated by the internal combustion engine 4. The secondary clutches 16 and the continuously variable transmission 20, on the contrary, are sized to continuously transmit (or even only for limited time intervals) only a fraction of the driving torque that can be generated by the internal combustion engine 4; in fact, a limited fraction (e.g. 30-40%) of the driving torque generated by the internal combustion engine 4 is always directed to the front wheels 2. In other words, car 1 can be driven only with the rear-wheel drive or with the four-wheel drive, but not with only the front-wheel drive. In this way, the secondary clutches 16 and the continuously variable transmission 20 have relatively limited dimensions and weights.

The connectable four-wheel drives described above have several advantages.

In the first place, the connectable four-wheel drives described above allow eliminating almost completely the energy dissipation in the secondary clutches 16, since the secondary clutches 16 operate in slipping (i.e., with a difference between the output speed and the input speed) only for brief moments (or only when turning) and in any case with a modest slip (or a speed difference between input and output).

Moreover, during the variation of the transmission ratio of the continuously variable transmission 20 no interruption of driving torque to the front wheels 2 ever occurs; therefore, the front wheels 2 are always engaged (even during gear changes) to the advantage of the car set-up. In other words, the continuously variable transmission 20 is able to ensure the gear shift under torque (i.e. in "power shift" mode) eliminating the temporary loss of the four-wheel drive during the shift.

Finally, the connectable four-wheel drives described above are simple and cost-effective to produce and are compact and lightweight.

What is claimed is:

1. A connectable four-wheel drive vehicle comprising:
    an engine having a drive shaft;
      a pair of main drive wheels;
      a main transmission line, which permanently connects the drive shaft to the main drive wheels and comprises a main gearbox and a main differential;
      a pair of secondary drive wheels, which are normally driven;

a connectable secondary transmission line to connect the drive shaft also to the secondary drive wheels and comprising two secondary clutches, each of which, on one side, has an input connected to the drive shaft upstream of the main gearbox and, on the other side, has an output directly connected to a respective secondary drive wheel; and a control unit;

wherein the connectable secondary transmission line comprises a continuously variable transmission, which is interposed between the drive shaft and the two secondary clutches and can be electronically controlled so as to continuously vary its gear ratio between two limit values without ever interrupting the torque transmission;

and wherein the control unit controls the continuously variable transmission of the connectable secondary transmission line so that, when the vehicle is driving along a straight stretch, the output of each secondary clutch always has the same rotation speed as the input of the secondary clutch itself;

wherein the control unit controls the continuously variable transmission of the connectable secondary transmission line such that, when the vehicle is turning, the output of each secondary clutch always rotates more slowly than the input of the secondary clutch itself.

2. A vehicle according to claim 1, wherein the lower limit value of the gear ratio of the continuously variable transmission is such that the input and the output of each secondary clutch have the same speed when a shortest forward gear is engaged in the main gearbox.

3. A vehicle according to claim 1, wherein the upper limit value of the shortest gear ratio of the continuously variable transmission is such that the input and the output of each the secondary clutch have the same speed when a forward gear comprised between a shortest forward gear and a longest gear is engaged in the main gearbox.

4. A vehicle according to claim 1, wherein the continuously variable transmission is roller-based.

5. A vehicle according to claim 1, wherein the control unit controls the continuously variable transmission of the connectable secondary transmission line so that the gear ratio of the continuously variable transmission is always coordinated with the gear ratio engaged in the main gearbox.

6. A vehicle according to claim 1, wherein a possible difference in the rotation speed of the two secondary drive wheels is compensated by means of a corresponding difference in the slip of the two secondary clutches.

7. A vehicle according to claim 1, wherein the control unit controls the continuously variable transmission of the connectable secondary transmission line so that, when the vehicle is turning, the rotation speed difference between the input and the output of each clutch is variable and increasing as the steering angle increases.

8. A vehicle according to claim 1, wherein only when the vehicle is turning, the control unit increases the transmission ratio of the continuously variable transmission of the connectable secondary transmission line so that the input of each secondary clutch rotates faster than the output of the secondary clutch itself.

9. A vehicle according to claim 1, wherein the control unit considers the vehicle to be turning when the steering angle of the front wheels is not null.

10. A vehicle according to claim 1, wherein the secondary transmission line also comprises a movement reversal unit, which can be controlled so as to reverse or not the movement direction.

* * * * *